US012627618B2

(12) United States Patent
Kennedy et al.

(10) Patent No.: US 12,627,618 B2
(45) Date of Patent: May 12, 2026

(54) MANAGING A SUBSYSTEM OF AN INFORMATION HANDLING SYSTEM BY A DATA PROCESSING UNIT (DPU)

(71) Applicant: Dell Products L.P., Round Rock, TX (US)

(72) Inventors: Jeffrey Leighton Kennedy, Austin, TX (US); Timothy M. Lambert, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 328 days.

(21) Appl. No.: 18/406,713

(22) Filed: Jan. 8, 2024

(65) Prior Publication Data

US 2025/0227075 A1     Jul. 10, 2025

(51) Int. Cl.
H04L 49/00     (2022.01)
H04L 49/253     (2022.01)

(52) U.S. Cl.
CPC ............ H04L 49/70 (2013.01); H04L 49/254 (2013.01)

(58) Field of Classification Search
None
See application file for complete search history.

(56) References Cited

U.S. PATENT DOCUMENTS

| | | | | | |
|---|---|---|---|---|---|
| 12,498,974 | B2 * | 12/2025 | Wang | .................... | G06F 9/5016 |
| 2007/0073966 | A1 * | 3/2007 | Corbin | .................... | H04L 69/10 |
| | | | | | 711/114 |

| | | | | | |
|---|---|---|---|---|---|
| 2011/0289279 | A1 * | 11/2011 | Sonnier | .............. | G06F 12/0804 |
| | | | | | 711/144 |
| 2019/0012278 | A1 * | 1/2019 | Sindhu | ................ | G06F 13/4282 |
| 2019/0012350 | A1 * | 1/2019 | Sindhu | ................. | G06F 9/5027 |
| 2020/0074083 | A1 * | 3/2020 | Hou | ..................... | G06F 11/1417 |
| 2021/0250285 | A1 * | 8/2021 | Noureddine | ............ | H04L 63/20 |
| 2022/0058062 | A1 * | 2/2022 | Sztejna | .................. | G06F 9/545 |
| 2022/0329450 | A1 * | 10/2022 | Servat | ................. | G06F 13/4221 |
| 2023/0205718 | A1 * | 6/2023 | Guim Bernat | ........ | G06F 9/5083 |
| | | | | | 710/316 |
| 2023/0379309 | A1 * | 11/2023 | Naeimi | ............... | H04L 63/0428 |
| 2024/0012769 | A1 * | 1/2024 | Guim Bernat | ...... | G06F 13/1668 |
| 2024/0056885 | A1 * | 2/2024 | Zhu | ........................ | H04W 76/15 |
| 2024/0259331 | A1 * | 8/2024 | Li | ............................ | H04L 49/70 |
| 2024/0311246 | A1 * | 9/2024 | Vaka | ................... | G06F 11/2092 |

(Continued)

*Primary Examiner* — Lonnie V Sweet
(74) *Attorney, Agent, or Firm* — McDermott Will & Schulte LLP

(57)     ABSTRACT

Managing a subsystem of an information handling system by a data processing unit (DPU), including identifying a first connection between the DPU and a switch; identifying a second connection between the switch and the subsystem; identifying computational capabilities of the DPU, including routing support of the DPU; determining, based on the identified computational capabilities of the DPU, that the DPU supports multi-directional link subdivision; in response to determining that the DPU supports multi-directional link subdivision: configuring the DPU to select the multi-directional link subdivision as an operating mode of the DPU; configuring the switch to invoke a virtual switch hierarchy at the switch to enable communication between the DPU and the subsystem through the virtual switch hierarchy; and after configuring the DPU and the switch, accessing, by the DPU, the subsystem to manage operation of the subsystem.

20 Claims, 4 Drawing Sheets

(56) References Cited

U.S. PATENT DOCUMENTS

| 2025/0097261 A1* | 3/2025 | Rozenbaum | H04L 41/16 |
| 2025/0138958 A1* | 5/2025 | Desai | G06F 21/602 |
| 2025/0240244 A1* | 7/2025 | Sharma | H04L 49/70 |
| 2025/0337684 A1* | 10/2025 | Rozenbaum | H04L 45/38 |

* cited by examiner

MANAGING A SUBSYSTEM OF AN INFORMATION HANDLING SYSTEM BY A DATA PROCESSING UNIT (DPU)

BACKGROUND

Field of the Disclosure

The disclosure relates generally to an information handling system, and in particular, managing a subsystem of the information handling system by a data processing unit (DPU).

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Innovative aspects of the subject matter described in this specification may be embodied in a method of managing a subsystem of an information handling system by a data processing unit (DPU), including identifying a first connection between the DPU and a switch; identifying a second connection between the switch and the subsystem; identifying computational capabilities of the DPU, including routing support of the DPU; determining, based on the identified computational capabilities of the DPU, that the DPU supports multi-directional link subdivision; in response to determining that the DPU supports multi-directional link subdivision: configuring the DPU to select the multi-directional link subdivision as an operating mode of the DPU; configuring the switch to invoke a virtual switch hierarchy at the switch to enable communication between the DPU and the subsystem through the virtual switch hierarchy; and after configuring the DPU and the switch, accessing, by the DPU, the subsystem to manage operation of the subsystem.

Other embodiments of these aspects include corresponding systems, apparatus, and computer programs, configured to perform the actions of the methods, encoded on computer storage devices.

These and other embodiments may each optionally include one or more of the following features. For instance, offloading one or more computational tasks to the subsystem by the DPU. Configuring the DPU to select multi-directional link subdivision includes partitioning communication channels of the DPU into a first group and a second group. Partitioning the communication channels of the DPU includes assigning the first group of communication channels as upstream communication channels and assigning the second group of communication channels as downstream communication channels. The DPU includes 16 communication channels, with the first group of communication channels including 8 communication channels and the second group of communication channels including 8 communication channels. Configuring the DPU to select multi-directional link subdivision includes assigning each of the communication channels of the DPU as upstream communication channels. Further in response to determining that the DPU supports multi-directional link subdivision, operating the DPU in a separate reference clock with independent spread (SRIS) mode. A reset signal between the DPU and the switch is an in-band reset signal. Identifying the first connection between the DPU and the switch includes identifying a coupling between a card edge of the DPU and a slot of the switch.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
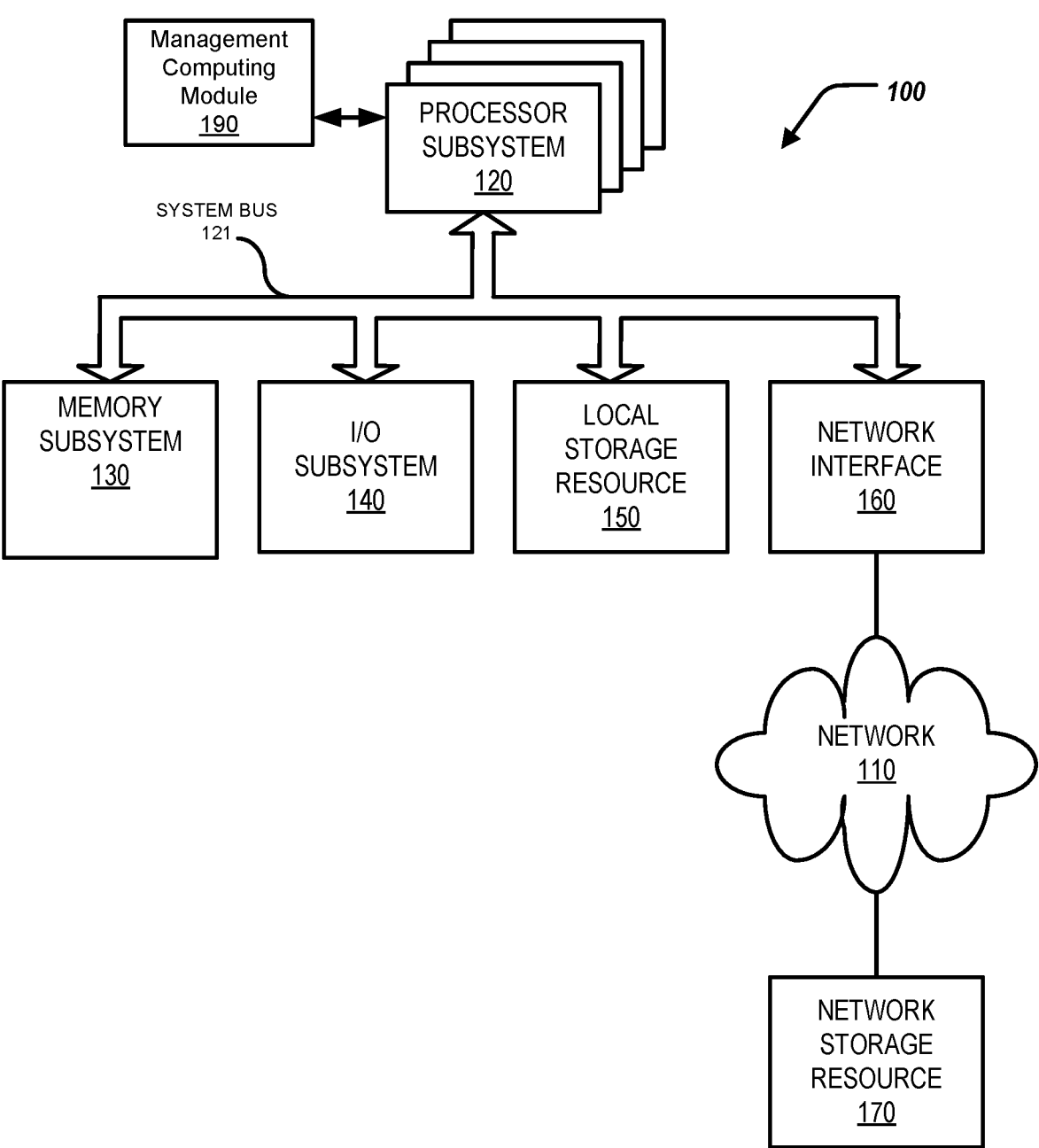
FIG. 1 is a block diagram of selected elements of an embodiment of an information handling system.

This disclosure discusses managing a subsystem of an information handling system by a data processing unit (DPU). In short, the DPU may need direct access to the subsystem, e.g., for offloading computational tasks at the subsystem. That is, the DPU can access and manage/control (partially or wholly) the subsystem without requiring/necessitating direct DPU-to-subsystem cabling. The DPU and a switch can support multi-directional communication channels and dynamic virtual switch reconfiguration, described further herein.

Specifically, this disclosure discusses a system and a method for managing a subsystem of an information handling system by a data processing unit (DPU), including identifying a first connection between the DPU and a switch; identifying a second connection between the switch and the subsystem; identifying computational capabilities of the DPU, including routing support of the DPU; determining, based on the identified computational capabilities of the DPU, that the DPU supports multi-directional link subdivision; in response to determining that the DPU supports multi-directional link subdivision: configuring the DPU to select the multi-directional link subdivision as an operating mode of the DPU; configuring the switch to invoke a virtual switch hierarchy at the switch to enable communication between the DPU and the subsystem through the virtual switch hierarchy; and after configuring the DPU and the switch, accessing, by the DPU, the subsystem to manage operation of the subsystem.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such as wires, optical fibers, microwaves, radio waves, and other electromagnetic and/or optical carriers; and/or any combination of the foregoing.

Particular embodiments are best understood by reference to FIGS. 1-4 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other types of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other types of rotating storage media, flash memory, EEPROM, and/or other types of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g., corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g., customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet, or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

The information handling system 100 can also include a management computing module 190. The management computing module 190 can be in communication with the processor subsystem 120, or included by the processor subsystem 120. In some examples, the management computing module 190 is included by an embedded controller (EC) of the information handling system 100. In some examples, the management computing module 190 is included by baseband management controller of the information handling system 100.

Figure 2:
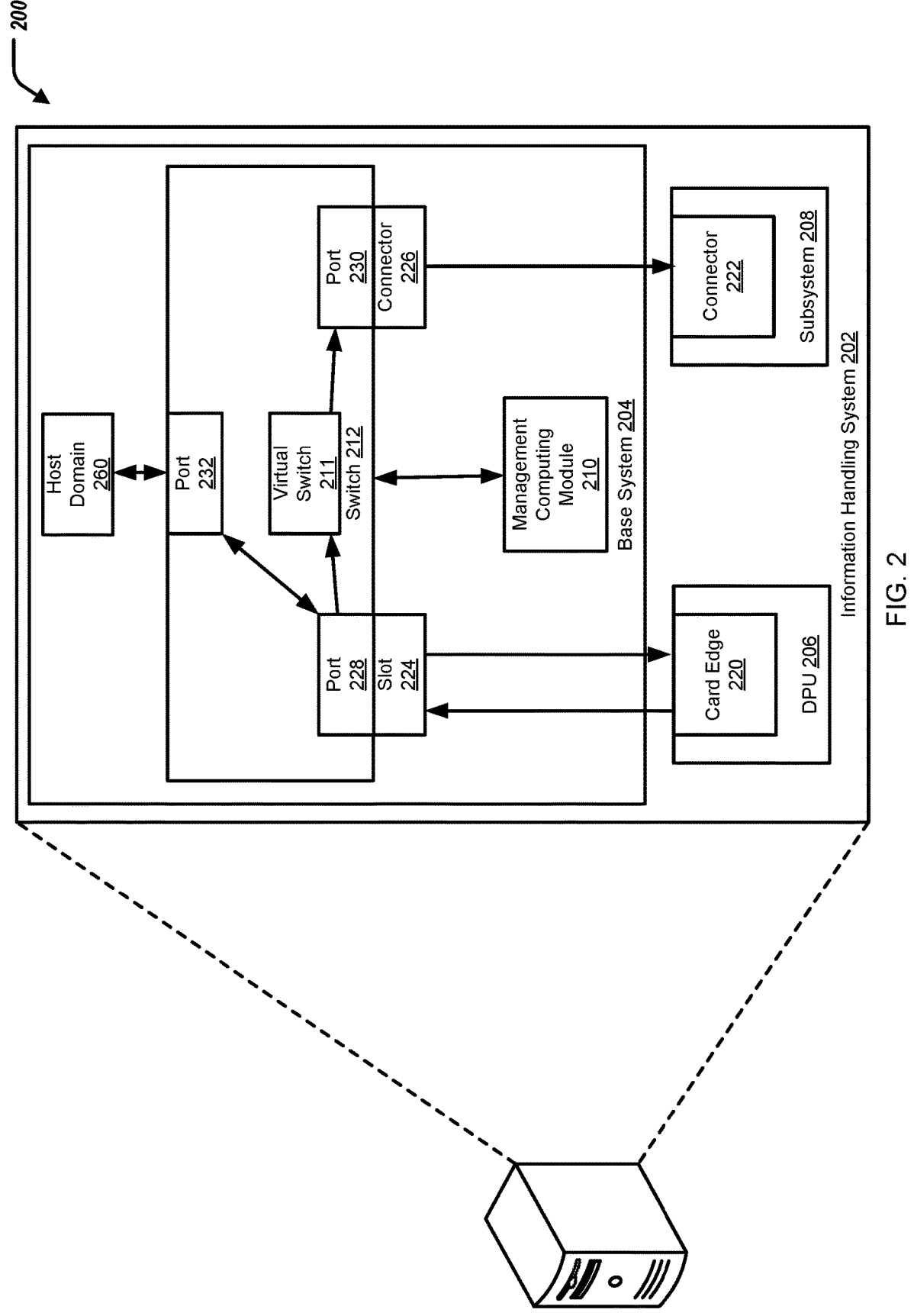
FIG. 2 illustrates a block diagram of an information handling system, including managing a subsystem of the information handling system by a data processing unit (DPU).

Turning to FIG. 2, FIG. 2 illustrates an environment 200 including an information handling system 202. The information handling system 202 can include a base system 204, a data processing unit 206, and a subsystem 208. In some examples, the information handling system 202 is similar to, or includes, the information handling system 100 of FIG. 1.

The base system 204 can include a management computing module 210 and a switch 212. In some examples, the management computing module 210 is the same, or substantially the same, as the management computing module 190 of FIG. 1.

The management computing module 210 can be in communication with the switch 212. The switch 212 can be in communication with the management computing module 210, the DPU 206, and the subsystem 208. The DPU 206 can be in communication with the switch 212. The subsystem 208 can be in communication with the switch 212.

The DPU 206 can include a card edge 220. For example, the card edge 220 can be a card electromechanical (CEM) card edge. For example, the card edge 220 can be a X16 CEM card edge.

In some examples, the subsystem 208 can include a non-volatile memory express (NVMe) backplane, a network interface card (NIC), or a peripheral component interconnect express (PCIe) card (NVME RAID, networking, CXL memory, etc.). The subsystem 208 can include a connector 222. For example, the connector 222 is a high-speed input/output (HSIO) connector. The connector 222 can be a connector or a card edge.

The switch 212 can include a port 228, a port 230, and a port 232.

The base system 204 can further include a slot 224 and a connector 226. The slot 224 can be a PCIe slot. The connector 226 can be a HSIO connector. The slot 224 can be in communication with the port 228. The connector 226 can be in communication with the port 230. The connector 226 can be a connector or a slot.

In short, the DPU 206 may need direct access to the subsystem 208, e.g., for offloading computational tasks at the subsystem 208. That is, the DPU 206 can access and manage/control (partially or wholly) the subsystem 208 without requiring/necessitating direct DPU 206 to subsystem 208 cabling. The DPU 206 and the switch 212 can support multi-directional communication channels and dynamic virtual switch reconfiguration, described further herein.

To that end, the DPU 206 can manage the subsystem 208. Specifically, the management computing module 210 can identify a first connection between the DPU 206 and the switch 212. Specifically, the DPU 206 can by physically coupled to the switch 212. That is, the card edge 220 of the DPU 206 can be physically coupled to the slot 224, with the port 228 of the switch 212 in communication with the slot 224. That is, the card edge 220 of the DPU 206 can be physically inserted into the slot 224. Further, when the DPU 206 is coupled to the switch 212, the DPU 206 is further in electrical communication with the switch 212 such that data/signals can be transmitted between the DPU 206 and the switch 206.

The management computing module 210 can identify a second connection between the switch 212 and the subsystem 208. Specifically, the connector 222 of the subsystem 208 can be connected to the connector 226, with the port 230 of the switch 212 in communication with the connector 226.

The management computing module 210 can identify computational capabilities of the DPU 206. For example, the management computing module 210 identify routing support of the DPU 206. That is, the management computing module 210 can confirm system routing support and user policies of the DPU 206. The management computing module 210 can identify support for alternate link subdivision at the DPU 206—e.g., mixed direction, upstream, downstream.

The management computing module 210 determines, based on the identified computational capabilities of the DPU 206, that the DPU 206 supports multi-directional link subdivision. That is, management computing module 210 reads a field replaceable unit (FRU) of the DPU 210 that indicates that the DPU 210 supports multi-directional link subdivision, and in response, determines that the DPU 206 supports multi-directional link subdivision. In other words, the management computing module 210 confirms system routing support and user policy associated with the DPU 206 such that the DPU 206 supports multi-directional link subdivision. For example, the management computing module 210 confirms that the DPU 210 supports mixed direction of communication-downstream and upstream.

The management computing module 210, in response to determining that the DPU 206 supports multi-directional link subdivision, configures the DPU 206 to select the multi-directional link subdivision as an operating mode of the DPU 206. Specifically, the management computing module 210 sends a command/instruction to the DPU 206 (e.g., through the switch 212) to select multi-directional link subdivision as the operating mode (alternate link subdivision mode).

In some examples, configuring the DPU 206 to select multi-directional link subdivision includes partitioning the communication channels of the DPU 206 into a first group and a second group. Specifically, the DPU 206 communicates with the switch 212 over communication channels therebetween. The DPU 206 partitions the communication channels into two or more groups (when the DPU 206 is operating in the multi-directional link subdivision mode). In some examples, the DPU 206 partitions the communication channels by assigning the first group of communication channels as upstream communication channels. That is, the first group of communication channels provide communication (data) from the DPU 206 to the switch 212. In some examples, the DPU 206 partitions the communication channels by assigning the second group of communication channels as downstream communication channels. That is, the second group of communication channels receive communication (data) from the switch 212 to the DPU 206. However, the DPU 206 can partition the communication channels into any subdivision of channels, and number of channels, and any combination of upstream/downstream channels.

In some examples, the DPU 206 communicates with the switch 212 over 16 communication channels. When the DPU 206 partitions the communication channels into a first group and a second group, the DPU 206 can partition the first group of communication channels into 8 communication channels and the second group of communication channels into 8 communication channels. For example, the first group of communication channels can include 8 upstream communication channels; and the second group of communication channels can include 8 downstream communication channels. However, the DPU 206 can partition the communication channels into any number of upstream communication channels and any number of downstream communication channels.

Further, in response to determining that the DPU 206 supports multi-directional link subdivision, the management computing module 210 configures the switch 212 to invoke a virtual switch hierarchy 211 at the switch 212. Specifically, the management computing module 210 configures the switch 212 to invokes the virtual switch hierarchy 211 to enable communication between the DPU 206 and the subsystem 208 through the virtual switch hierarchy 211. In particular, the management computing module 210 provides a command/instruction to the switch 212 for the virtual switch 211 to receive upstream communications from the DPU 206 (received through the port 228) and route such communications downstream to the subsystem 208 (through the port 230). In short, the switch 212 can be configured to turn any of the ports of the ports 228, 230 to upstream or downstream such that the virtual switch hierarchy 211 can include any topological desired. For example, the switch 212 can be configured to turn any of the ports of the ports 228, 230 to upstream or downstream based on the number of upstream communication channels and downstream communication channels between the DPU 206 and the switch 212.

After the DPU 206 and the switch 212 are configured, the DPU 206 can access the subsystem 208. Specifically, the DPU 206 can route communications/instructions through the switch 212 to access the subsystem 208. In particular, the DPU 206 can route such communications/instructions through the virtual switch hierarchy 211 to the subsystem 208. The virtual switch 211 can receive such communications/instructions through upstream ports of the port 228 and route such communications/instructions to the subsystem 208 through downstream ports of the port 230.

Furthermore, the DPU 206 accesses the subsystem 208 to manage operation of the subsystem 208. Specifically, the DPU 206 access the subsystem 208 through the switch 212 to manage operation (partially or wholly) of the subsystem 208. For example, managing operation of the subsystem 208 can include offloading one or more computational tasks to the subsystem 208 by the DPU 206. That is, the DPU 208 can provide communications/instructions to offloading computational tasks to the subsystem 208 that normally would be performed by/at the DPU 206.

Furthermore, when the switch 212 is configured to invoke the virtual switch hierarchy 211, communication channels from the port 228 can be partitioned between the virtual switch 211 and the port 232. That is, upstream communication channels from the port 228 can be partitioned in a first group of communication channels directed to the port 232 and a second group of communication channels directed at the virtual switch 211. Specifically, the port 232 can be in communication with a host domain 260 (e.g., one or more other computing modules of the information handling system 202 such as processor, motherboard, and the like). The first group of communication channels between the port 232 and the port 228 can be any combination of upstream communication channels and downstream communication channels.

To that end, the DPU 206 and the host domain 260 may have the ability to split roles therebetween. For example, upon hot plug of the DPU 206 with the switch 212, the host domain 260 can attest/provision before assignment to the DPU 206.

In some examples, configuring the DPU 206 to select multi-directional link subdivision includes assigning each of the communication channels between the DPU 206 and the switch 212 as upstream communication channels. That is, the directionality of the communication channels between the DPU 206 and the switch 212 can be fully reversible. In some examples, configuring the switch 212 to invoke the virtual switch hierarchy 211 can include assigning each of the communication channels between the port 228 and the virtual switch hierarchy 211 as upstream communication channels (e.g., when the DPU 206 accesses the subsystem 208 and not the host domain 260).

Figure 3:
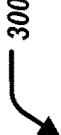
FIG. 3 illustrates a block diagram of the DPU in communication with a switch.
Figure 3:
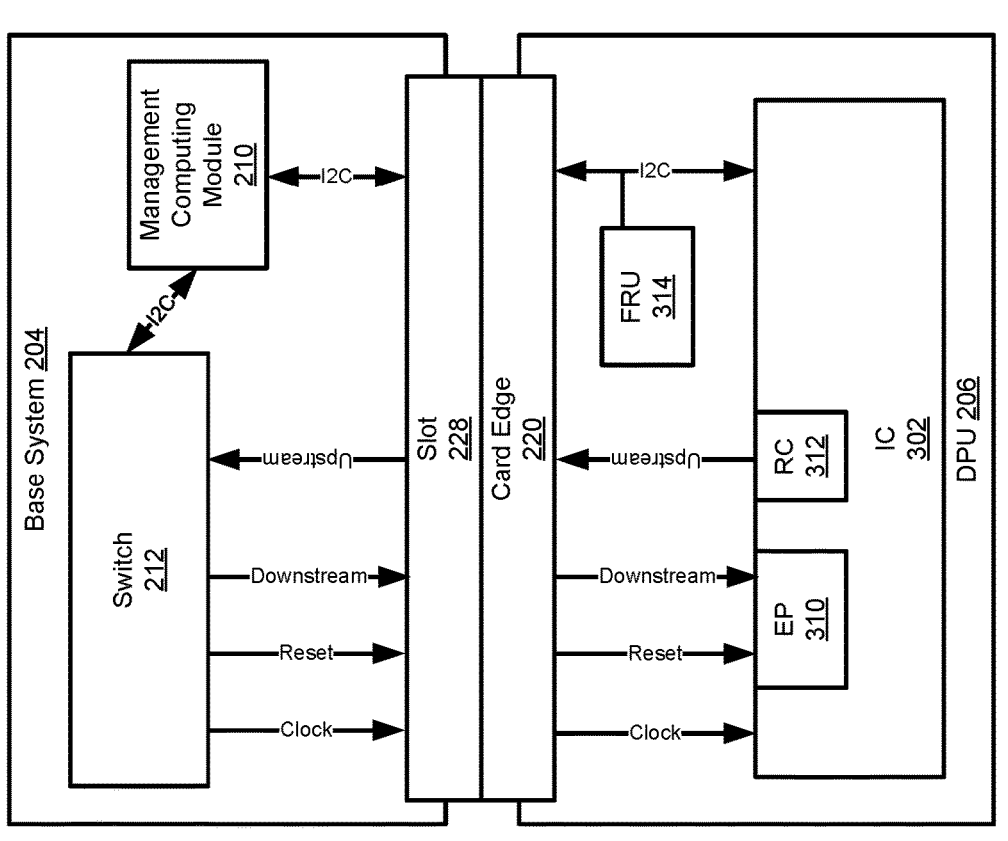

FIG. 3 illustrates a block diagram of the DPU 206 in communication with the switch 212. The DPU 206 can further include an integrated circuit (IC) module 302. The IC module 302 can include an endpoint (EP) or downstream device 310 and a root controller (RC) (or root port) 312 that is upstream of the EP 310. The DPU 206 can further include a field replaceable unit (FRU) 314.

In some examples, further in response to determining that the DPU 206 supports multi-directional link subdivision, the DPU 206 operates in a separate reference clock with independent spread (SRIS) mode. That is, as a result of the card edge 220 supporting only one set of clock pins, the multi-directional link subdivision mode of the DPU 206 supports SIRS mode (clockless) that is supported by the switch 212.

In some examples, further in response to determining that the DPU 206 supports multi-directional link subdivision, a reset signal between the DPU 206 and the switch 212 is an in-band reset signal. Specifically, as a result of the card edge 220 supporting only one downstream facing reset (PCIe express reset—PERST), the DPU 206 can place an out of band (OOB) request to the management computing module 210 to control the DPU 206 mapped endpoints.

Figure 4:
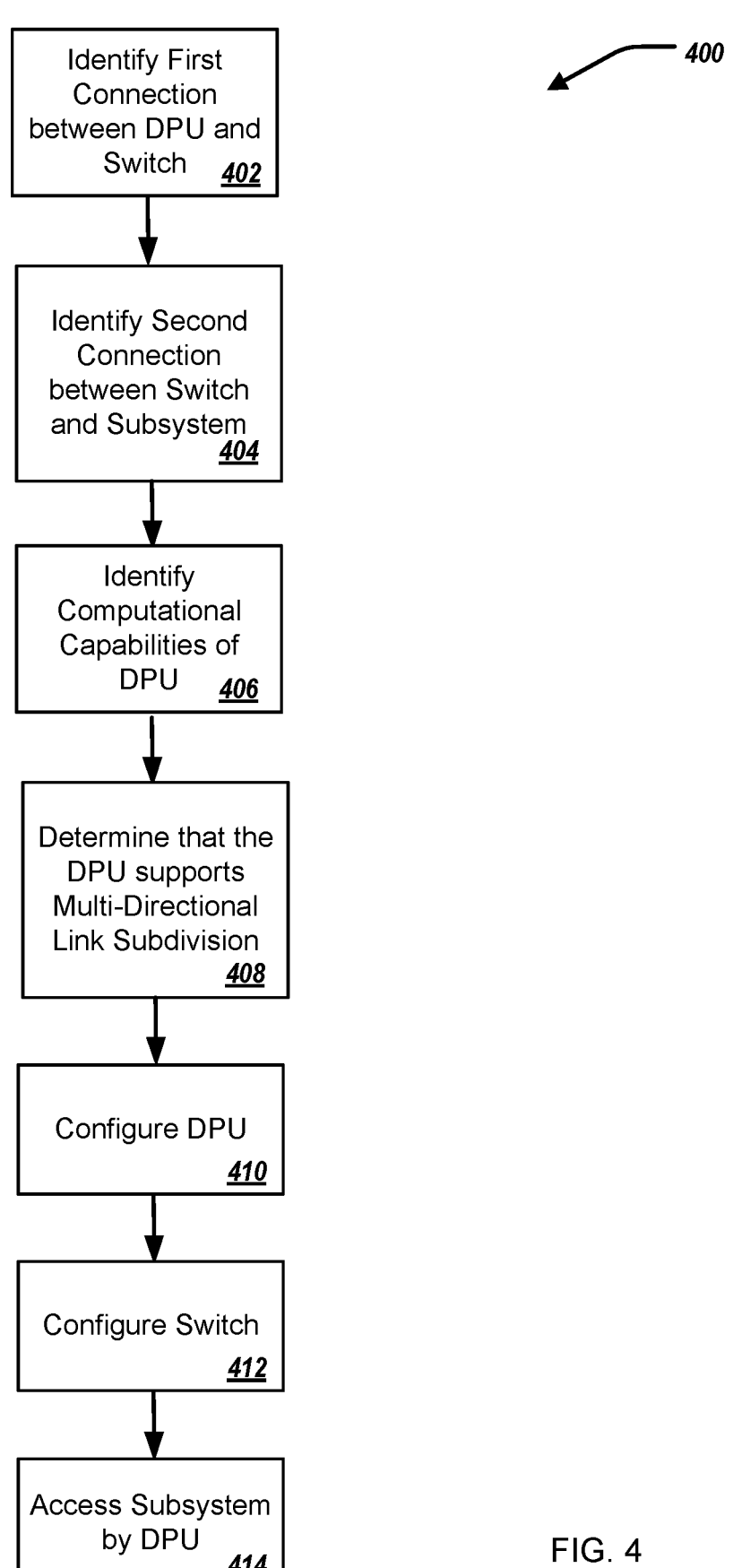
FIG. 4 illustrates a method for managing the subsystem by the DPU.

FIG. 4 illustrates a flowchart depicting selected elements of an embodiment of a method 400 for managing the subsystem 208 by the DPU 206. The method 400 may be performed by the information handling system 100, the information handling system 202, the DPU 206, the management computing module 210, and/or the switch 212, and with reference to FIGS. 1-2. It is noted that certain operations described in method 400 may be optional or may be rearranged in different embodiments.

The management computing module 210 identifies a first connection between the DPU 206 and a switch 212, at 402. The management computing module 210 identifies a second connection between the switch 212 and the subsystem 208, at 404. The management computing module 210 identifies computational capabilities of the DPU 206, at 406. The management computing module 210 determines, based on the identified computational capabilities of the DPU 206, that the DPU 206 supports multi-directional link subdivision, at 408. In response to determining that the DPU 206 supports multi-directional link subdivision, the management computing module 210 configures the DPU 206 to select the multi-directional link subdivision as an operating mode of the DPU 206, at 410. Further in response to determining that the DPU 206 supports multi-directional link subdivision, the management computing module 210 configures the switch 212 to invoke the virtual switch hierarchy 211 at the switch 212 to enable communication between the DPU 206 and the subsystem 208 through the virtual switch hierarchy 211, at 412. After configuring the DPU 206 and the switch 212, the DPU 206 accesses the subsystem 208 to manage operation of the subsystem 208, at 414.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both,"

unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method of managing a subsystem of an information handling system by a data processing unit (DPU), including:

identifying a first connection between the DPU and a switch;

identifying a second connection between the switch and the subsystem;

identifying computational capabilities of the DPU, including routing support of the DPU;

determining, based on the identified computational capabilities of the DPU, that the DPU supports multi-directional link subdivision;

in response to determining that the DPU supports multi-directional link subdivision:

configuring the DPU to select the multi-directional link subdivision as an operating mode of the DPU;

configuring the switch to invoke a virtual switch hierarchy at the switch to enable communication between the DPU and the subsystem through the virtual switch hierarchy; and after configuring the DPU and the switch, accessing, by the DPU, the subsystem to manage operation of the subsystem.

2. The computer-implemented method of claim 1, wherein managing operation of the subsystem includes offloading one or more computational tasks to the subsystem by the DPU.

3. The computer-implemented method of claim 1, wherein configuring the DPU to select multi-directional link subdivision includes partitioning communication channels of the DPU into a first group and a second group.

4. The computer-implemented method of claim 3, wherein partitioning the communication channels of the DPU includes assigning the first group of communication channels as upstream communication channels and assigning the second group of communication channels as downstream communication channels.

5. The computer-implemented method of claim 4, wherein the DPU includes 16 communication channels, with the first group of communication channels including 8 communication channels and the second group of communication channels including 8 communication channels.

6. The computer-implemented method of claim 1, wherein configuring the DPU to select multi-directional link subdivision includes assigning each of the communication channels of the DPU as upstream communication channels.

7. The computer-implemented method of claim 1, further in response to determining that the DPU supports multi-directional link subdivision, operating the DPU in a separate reference clock with independent spread (SRIS) mode.

8. The computer-implemented method of claim 1, wherein a reset signal between the DPU and the switch is an in-band reset signal.

9. The computer-implemented method of claim 1, wherein identifying the first connection between the DPU and the switch includes identifying a coupling between a card edge of the DPU and a slot of the switch.

10. An information handling system comprising a processor having access to memory media storing instructions executable by the processor to perform operations, comprising:

identifying a first connection between a DPU and a switch;

identifying a second connection between the switch and a subsystem;

identifying computational capabilities of the DPU, including routing support of the DPU;

determining, based on the identified computational capabilities of the DPU, that the DPU supports multi-directional link subdivision;

in response to determining that the DPU supports multi-directional link subdivision:

configuring the DPU to select the multi-directional link subdivision as an operating mode of the DPU;

configuring the switch to invoke a virtual switch hierarchy at the switch to enable communication between the DPU and the subsystem through the virtual switch hierarchy; and after configuring the DPU and the switch, accessing, by the DPU, the subsystem to manage operation of the subsystem.

11. The information handling system of claim 10, wherein managing operation of the subsystem includes offloading one or more computational tasks to the subsystem by the DPU.

12. The information handling system of claim 10, wherein configuring the DPU to select multi-directional link subdivision includes partitioning communication channels of the DPU into a first group and a second group.

13. The information handling system of claim 12, wherein partitioning the communication channels of the DPU includes assigning the first group of communication channels as upstream communication channels and assigning the second group of communication channels as downstream communication channels.

14. The information handling system of claim 13, wherein the DPU includes 16 communication channels, with the first group of communication channels including 8 communication channels and the second group of communication channels including 8 communication channels.

15. The information handling system of claim 10, wherein configuring the DPU to select multi-directional link subdivision includes assigning each of the communication channels of the DPU as upstream communication channels.

16. The information handling system of claim 10, the operations further include in response to determining that the DPU supports multi-directional link subdivision, operating the DPU in a separate reference clock with independent spread (SRIS) mode.

17. The information handling system of claim 10, wherein a reset signal between the DPU and the switch is an in-band reset signal.

18. The information handling system of claim 10, wherein identifying the first connection between the DPU and the switch includes identifying a coupling between a card edge of the DPU and a port of the switch by way of a slot or connector.

19. A non-transitory computer-readable medium storing software comprising instructions executable by one or more computers which, upon such execution, cause the one or more computers to perform operations comprising:

identifying a first connection between a DPU and a switch;

identifying a second connection between the switch and a subsystem;

identifying computational capabilities of the DPU, including routing support of the DPU;

determining, based on the identified computational capabilities of the DPU, that the DPU supports multi-directional link subdivision;

in response to determining that the DPU supports multi-directional link subdivision:

configuring the DPU to select the multi-directional link subdivision as an operating mode of the DPU;

configuring the switch to invoke a virtual switch hierarchy at the switch to enable communication between the DPU and the subsystem through the virtual switch hierarchy; and after configuring the DPU and the switch, accessing, by the DPU, the subsystem to manage operation of the subsystem.

20. The non-transitory computer-readable medium of claim 19, wherein managing operation of the subsystem includes offloading one or more computational tasks to the subsystem by the DPU.

* * * * *